(12) United States Patent
Makohon et al.

(10) Patent No.: US 10,419,473 B1
(45) Date of Patent: Sep. 17, 2019

(54) SITUATIONAL AWARENESS AND PERIMETER PROTECTION ORCHESTRATION

(71) Applicant: Wells Fargo Bank, N.A., San Francisco, CA (US)

(72) Inventors: Peter A. Makohon, Huntersville, NC (US); Robert I. Kirby, Charlotte, NC (US); Christopher Houser, Mt. Holly, NC (US); Lawrence T. Belton, Jr., Charlotte, NC (US); Terrence W. Gareau, Coconut Creek, FL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 212 days.

(21) Appl. No.: 15/335,019

(22) Filed: Oct. 26, 2016

(51) Int. Cl.
*H04L 29/06* (2006.01)
*H04L 12/26* (2006.01)

(52) U.S. Cl.
CPC ...... *H04L 63/1441* (2013.01); *H04L 43/0882* (2013.01); *H04L 43/0894* (2013.01); *H04L 63/1425* (2013.01)

(58) Field of Classification Search
CPC .................. H04L 63/1425; H04L 63/1441
See application file for complete search history.

(56) References Cited

U.S. PATENT DOCUMENTS

| | | | |
|---|---|---|---|
| 2005/0152375 A1* | 7/2005 | An | H04L 47/10 370/395.41 |
| 2005/0259645 A1* | 11/2005 | Chen | H04L 29/12066 370/389 |
| 2007/0192870 A1* | 8/2007 | Lynn | H04L 41/0893 726/26 |
| 2008/0052774 A1* | 2/2008 | Chesla | G06F 21/552 726/13 |
| 2012/0233656 A1* | 9/2012 | Rieschick | H04L 63/1441 726/1 |
| 2016/0173446 A1* | 6/2016 | Nantel | H04L 63/1425 726/11 |
| 2017/0126727 A1* | 5/2017 | Beam | H04L 63/20 |
| 2017/0359372 A1* | 12/2017 | Ronen | H04L 63/1458 |

* cited by examiner

*Primary Examiner* — Dao Q Ho
(74) *Attorney, Agent, or Firm* — Walter Haverfield LLP; James J. Pingor

(57) ABSTRACT

Systems and methods provide for a situational awareness and perimeter protection orchestration system to determine when network attacks are occurring or are about to occur, and provide tools and services to mitigate the attacks. The attacks can be denial of service attacks or distributed denial of service attacks or other types of attacks designed to disable and degrade a network. The dashboard can collect intelligence on what is happening on the network, and also streams of information from third parties that can be used to predict imminent network attacks. The dashboard can also determine what tools and services are available to the network operator in order to counteract the attacks.

16 Claims, 10 Drawing Sheets

SITUATIONAL AWARENESS AND PERIMETER PROTECTION ORCHESTRATION

BACKGROUND

Denial of service attacks and particularly, Distributed Denial of Service (DDOS) are a real, growing threat to businesses worldwide. Designed to elude detection by today's most popular tools, these attacks can quickly incapacitate a targeted business, costing victims thousands, if not millions, of dollars in lost revenue and productivity. DDoS attacks paralyze Internet systems by overwhelming servers, network links, and network devices (e.g., routers, firewalls, etc.) with bogus traffic. Easily launched against limited defenses, DDoS attacks not only target individual web sites or other servers at the edge of the network, but they also subdue the network itself.

The growing dependence on the Internet makes the impact of successful DDoS attacks increasingly painful (financially and otherwise) for service providers, enterprises, and government agencies. Newer, more powerful DDoS tools promise to unleash even more destructive attacks in the months and years to come. Because DDoS attacks are among the most difficult to defend against, responding to them appropriately and effectively poses a tremendous challenge for all Internet-dependent organizations. Network devices and traditional perimeter security technologies, such as firewalls and intrusion detection systems (IDSs), although important components of an overall security strategy, do not by themselves provide comprehensive DDoS protection.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate a situational awareness and perimeter protection orchestration system to determine when network attacks are occurring or are about to occur, and provide tools and services to mitigate the attacks. The attacks can be denial of service attacks or distributed denial of service attacks or other types of attacks designed to disable and degrade a network. A dashboard can collect intelligence on what is happening on the network, and also streams of information from third parties that can be used to predict imminent network attacks. The dashboard can also determine what tools and services are available to the network operator in order to counteract the attacks.

For these considerations, as well as other considerations, in one or more embodiments, a system can include a memory to store computer-executable instructions and a processor, coupled to the memory, to facilitate execution of the computer-executable instructions to perform operations. The operations can include receiving network data from a plurality of network elements in a network and determining that a network attack on a network element of the plurality of network elements is occurring based on the network data. The operations can also include determining a service that can counteract the network attack. The operations can also include displaying the network data, information about the network attack, and information about the service on a user interface.

In another embodiment, a method for providing a dashboard for network attack mitigation can comprise receiving, by a device comprising a processor, network data from a plurality of network elements in a network. The method can also include determining, by the device, that a network attack on a network element of the plurality of network elements is imminent based on the network data. The method can also include determining, by the device, a service that can counteract the network attack. The method can also include displaying, by the device, the network data, information about the network attack, and information about the service on a user interface.

In another embodiment, a non-transitory computer-readable medium, comprising instructions that when executed by a computer processor perform operations. The operations can include receiving network data from a plurality of network elements in a network. The operations can also include determining that a network attack on a network element of the plurality of network elements is occurring based on the network data. The operations can also include determining, by the device, a service that can counteract the network attack. The operations can also include displaying, by the device, the network data, information about the network attack, and information about the service on a user interface.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
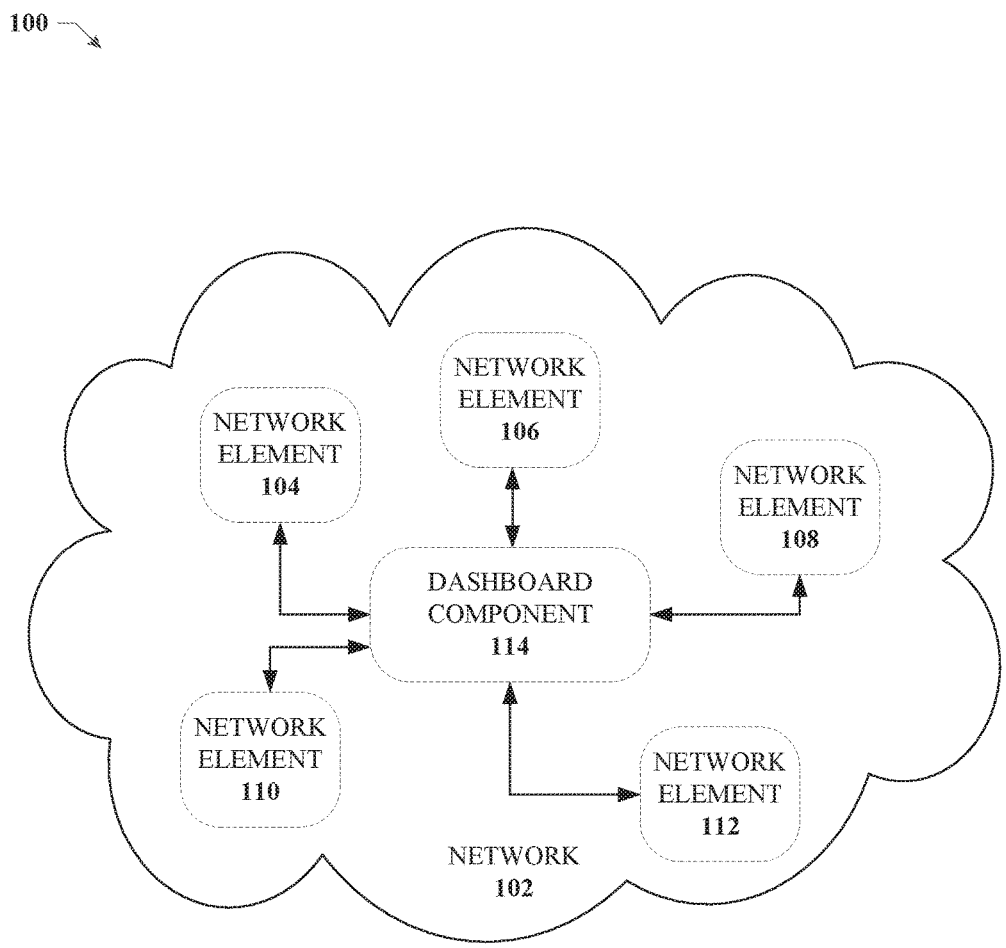
FIG. 1 is an illustration of an example system for providing dashboard for network attack mitigation in accordance with one or more aspects of the disclosure.

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In one or more embodiments a dashboard for providing perimeter protection and network attack mitigation support can be provided by providing a one-stop resource for network operators. The dashboard can gather and display realtime data about network operations performance of various network elements in the network, the network elements being servers, routers, and various logical entities uniting one or more physical devices. The network operations and network traffic can be tracked using various flow metrics that sample traffic and packet data to gain a visualization of what traffic is coming in over the network. The network operations displayed by the dashboard can also include active or passive probing of external site. The network traffic can be analyzed to determine whether or not attacks on the network as a whole or various network elements are occurring. The dashboard can also determine what types of tools or services are available to counteract the attacks and display a list of the tools and services to allow the network operators to manage the network and mitigate the attacks.

In an embodiment, the dashboard can also gather data and intelligence from third parties that provide cyberthreat intelligence feeds on actors, potential attacks, previous attacks, and other specific technical indicators on what to look for. The dashboard can also receive information on mitigation strategies from security contractors and security services, from industry associations, regulators, and other financial institutions.

Turning now to FIG. 1, illustrated is an example system 100 that can distinguish between types of attacks in accordance with one or more aspects of the disclosure. A dashboard component 114 can receive data from various network elements 104, 106, 108, 110, and 112 in a network 102 to determine whether network attacks are occurring, or are imminent, and then provide a list of tools and services to a network operator to mitigate any such attacks.

In an embodiment, dashboard component 114 can use flow metrics protocols to sample and analyze data and traffic to and from the network elements 104-112. The flow metrics can include NetFlow and sFlow and other protocols to determine the source and destination of traffic received at the network elements, class of service, and causes of congestion. In an embodiment, the dashboard component 114 can aggregate packets into flows and exports flow records towards one or more flow collectors and use the flow collectors to receive, store, and pre-process the flow data received from the flow exporter. The dashboard component 114 can then analyze the flow data in the context of intrusion detection or traffic profiling.

When sampling flow data, the dashboard component 114 can perform at least two types of sampling, random sampling of packets or application layer operations and time based sampling of counters. The sampled packet/operation and counter information, the flow samples and counter samples respectively can then be processed by a collector that analyzes the data and reports on the network traffic. The dashboard component 114 can provide a realtime display showing traffic, congestion, and sources and destinations of traffic to enable an operator to determine whether the network is under attack. In an embodiment, the dashboard component 114 can determine a baseline level of activity and in response to the activity deviating from the baseline by a predetermined amount, measured either by a percentage difference or volume difference, the dashboard component 114 can provide an alert, notification or alarm, indicating the deviation to bring it to the attention of the network operator.

It is to be appreciated that the dashboard component 114 can perform sampling and flow analysis using protocols other than NetFlow and sFlow.

In an embodiment, the dashboard component 114 can analyze traffic and network data at a list of predefined network elements, a subset of network elements in a network, (e.g., network elements 104-108) or all network elements in a network. It is to be appreciated that network 102 is not limited to being a logical or physical local network. In some embodiments, the network 102 can refer to a variety a networks that are under control and management by an network operator associated with the dashboard component 114. For instance, the various network elements can be disparate servers, and other physical devices that are on a local network or externally facing, or on different networks completely.

Dashboard component 114 can have access to a database indicating what types of network elements the network elements 104-112 are. For instance, heavy traffic and congestion on network 104 (if network element 104 was an inward facing element) may indicate malware or other types of hostile or intrusive software residing in the network 102 somewhere. Heavy traffic on network element 106 that is external facing may indicate a DDOS type attack.

Dashboard component 114 can provide realtime reports on the traffic, congestion, and type of data that is being processed by the network elements 104-112 to very quickly allow the network operator to respond to the attacks. The dashboard component 114 can also track the network traffic and operations over time to try to identify patterns and other cues that may indicate when an attack is going to happen. For instance, the dashboard component 114 can look at network operations before previous attacks, and look at a predetermined amount of time, e.g., an hour, a day, a week, etc., of network data before the attack to determine if any patterns can be recognized to allow the network operator to begin mitigating the attack before it occurs.

In an embodiment, a network element 110 can include an interactive voice response server that receives input from customers and other users of the network 102. If people call to indicate that they are experiencing slowness of one or more websites or tools or services hosted by the network 102, then the interactive voice response server at network element 110 can indicate to dashboard component 114 that there is network slowness somewhere on the network 102, or can indicate that a particular network element or server is experiencing slowness. Thus, dashboard component 114 can get user feedback of slowness from people calling a helpdesk number.

In an embodiment, the dashboard component 114 can also receive intelligence feeds and data feeds from other networks, or other institutions. Other financial institutions or industry associations, or security organizations, or law enforcement sources can track what is happening on networks other than network 102, and provide realtime or close to realtime data feeds to dashboard component 114. Dashboard component 114 can determine whether attacks are imminent based on patterns or intelligence information from these other feeds. By tracking volume, frequency, technique, targets, etc., of attacks on other networks, dashboard component 114 can predict, and more quickly identify nascent attacks on the network 102 or one or more network elements 104-112.

Dashboard component 114 can also identify the tools and services that are available to the network operators to mitigate the network attacks and manage the network 102. Firewalls and intrusion detection systems can be part of the solution, but other tools and services possibly available to the network operators include router filtering, overprovisioning, access control lists, and other techniques to mitigate the harm caused by network attacks. In an embodiment, dashboard component 114 can consult a predetermined playbook to determine what types of tools and services are best to respond to the current or potential network attacks. The dashboard component 114 can model different solutions and recommend one or more of the services to the network operator based on the type of attack. The dashboard component 114 can also use information from the third parties to respond to the network attack. For instance, if a similar attack has been experienced by another network, and a mitigation solution has proved effective or ineffective in mitigating the attack, dashboard component 114 can use that information when recommending tools and services.

Figure 2A:
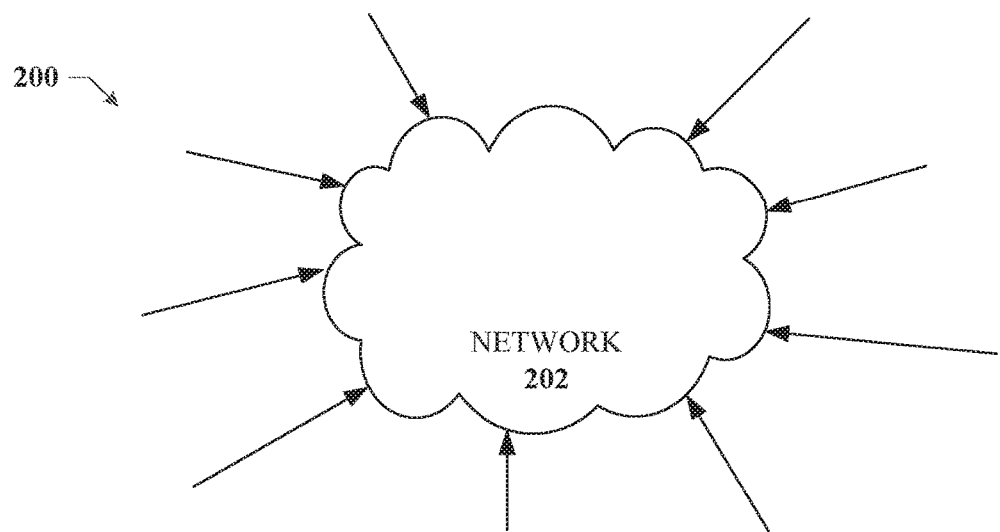
FIGS. 2A and 2B are an illustration of an example system that can distinguish between types of attacks in accordance with one or more aspects of the disclosure.
Figure 2B:
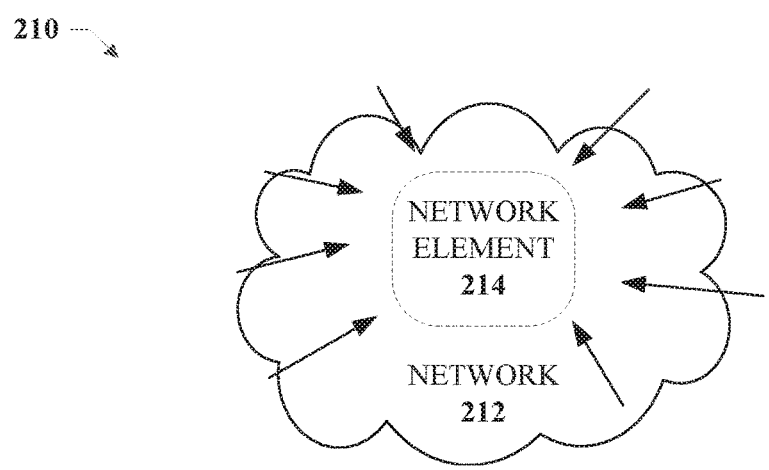

Turning now to FIGS. 2A and 2B, illustrated is an example system 200 and 210 that can distinguish between types of attacks in accordance with one or more aspects of the disclosure.

Different types of network attacks may have different tools and services that are used to mitigate the attacks, so correctly identifying the type of attack is important. Identifying the attack can also be used to help predict where and when future attacks will occur.

In an embodiment shown in 200 in FIG. 2A, the dashboard system can determine that the network 202 is experiencing a volumetric attack. A volumetric attack is the simplest of the DDoS attack types. Its goal is to flood a target with as much traffic as possible to prevent it from operating normally. To be successful, the volumetric DDoS attack only needs to take up enough of the target's Internet connection capacity to affect legitimate operations; a really successful attack will be able to affect most or all of the target's clients. Some common examples of a volumetric attack are Internet Control Message Protocol (ICMP)/User Datagram Protocol (UDP) packet floods, Spoofed packet floods and malformed packet floods.

A protocol attack is a little different and is focused on exhausting the protocol resources of a target. Some common protocol DDoS attack examples include TCP SYN/ACK/RST/Connection floods, TCP state exhaustion and TCP windowing attacks. This type of attack does not require that the attacker consume most or all of the target's available bandwidth, only that it consumes the target's specific resource.

In 210 in FIG. 2B, the network 212 and the network element 214 can be facing a more directed attack such as an application attack. An application attack is focused further up the chain with a specific application resource, e.g., network element 214. The application DDoS attack is focused more on specific vulnerabilities while the others are targeted at more general resources that exist on many devices. What this means is that this style of attack does not need to be as coordinated as the other two. Some common examples include HTTP GET/POST Floods, DNS amplification, and SSL exhaustion attacks.

Figure 3:
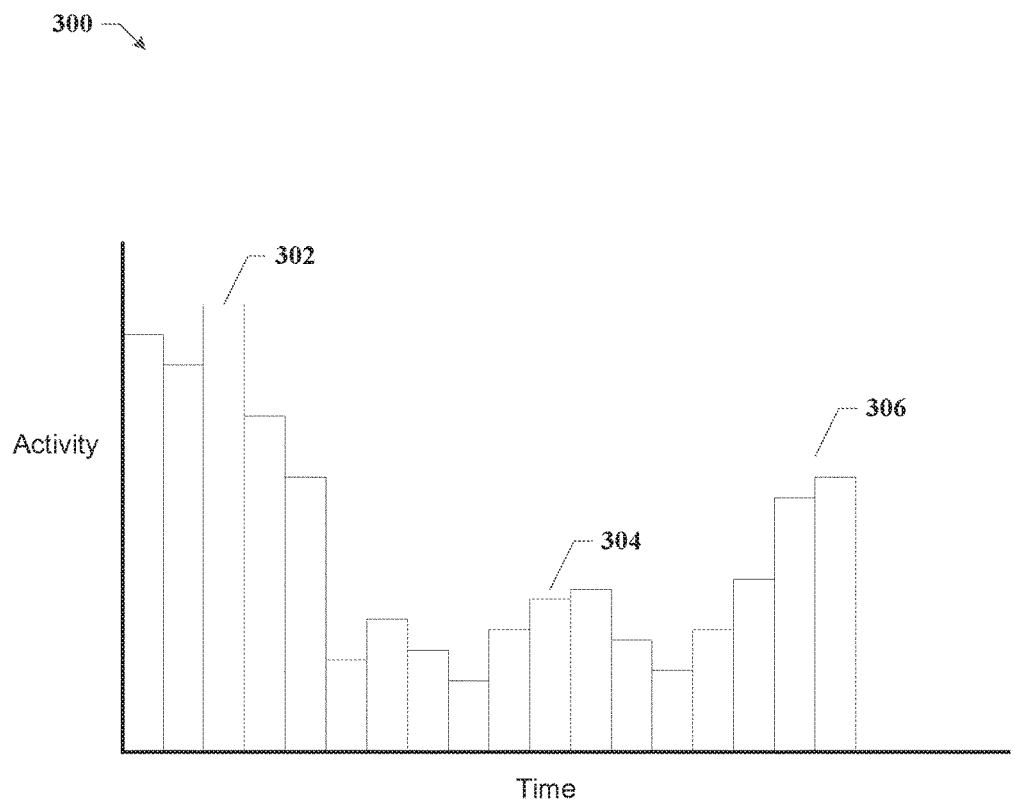
FIG. 3 is an illustration of an example system that can analyze past attacks in accordance with one or more aspects of the disclosure.

Turning now to FIG. 3, illustrated is an example system 300 that can analyze past attacks in accordance with one or more aspects of the disclosure. The dashboard component 114 from FIG. 1, can analyze historical attacks and determine trends and patterns that can indicate when or where a network attack can next come. Additionally, the analysis can also provide baseline information to determine whether or not an attack is currently underway. For instance, if certain types or volumes of traffic are determined to precede past attacks, an attack can be predicted in the near future if that type of traffic and/or volume are occurring currently.

In an embodiment, dashboard component 114 can analyze past traffic on the network 102 and determine that at time 302 the system was under attack due to the higher activity levels. Although not shown in the figure, it is to be appreciated that the dashboard component 114 can also track types of activity, source and destination of the traffic, and etc.

At time 304, the dashboard component 114 can determine that the level of activity is low, and is probably not under attack. The dashboard component 114 can determine that the level of activity at 304 is the baseline level of activity, or normal level, and variations thereof can indicate suspicious activity. In response to the activity deviating from the baseline by a predetermined amount, measured either by a percentage difference or volume difference, the dashboard component 114 can provide an alert, notification or alarm, indicating the deviation to bring it to the attention of the network operator. At time 306, the activity level can pick back up again, and dashboard component 114 can detect the deviation from the baseline at 304 and indicate that an attack is occurring, or is about to occur.

In an embodiment, the dashboard component 114 can display that chart 300 to allow a network operator to view the traffic variations over time. The dashboard component 114 can generate the chart based on data received from network elements in a network (e.g., network elements 104-112 in network 102). In an embodiment, dashboard component 114 can use flow metrics protocols to sample and analyze data and traffic to and from the network elements 104-112. The flow metrics can include NetFlow and sFlow and other protocols to determine the source and destination of traffic received at the network elements, class of service, and causes of congestion. In an embodiment, the dashboard component 114 can aggregate packets into flows and exports flow records towards one or more flow collectors and use the flow collectors to receive, store, and pre-process the flow data received from the flow exporter. The sampled and analyzed data can then be presented in charts such as chart 300.

Figure 4:
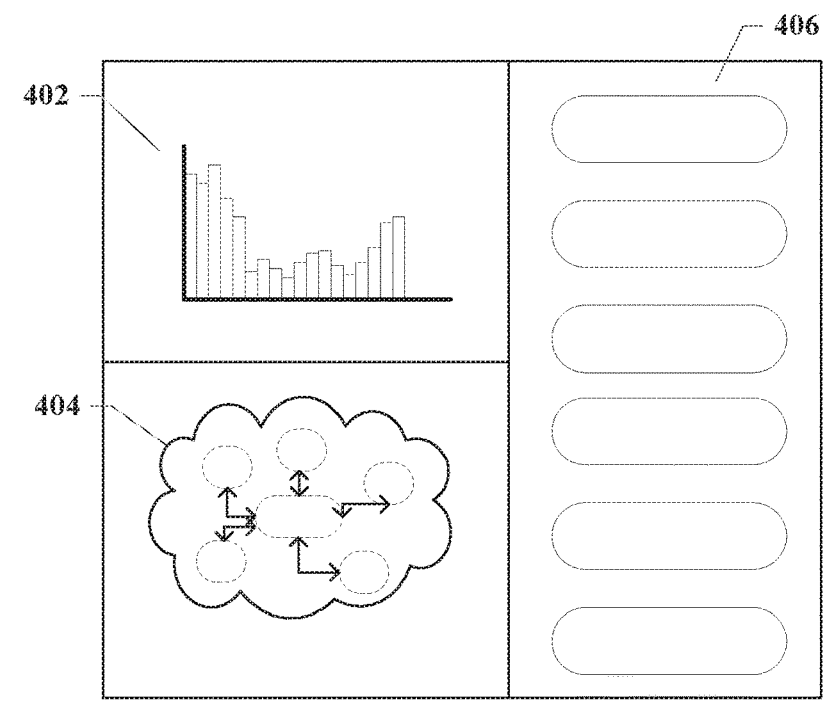
FIG. 4 is an illustration of an example dashboard for providing situational awareness and perimeter protection and orchestration in accordance with one or more aspects of the disclosure.

Turning now to FIG. 4, illustrated is an example dashboard 400 for providing situational awareness and perimeter protection and orchestration in accordance with one or more aspects of the disclosure. The dashboard component 114 can generate an interactive dashboard 400 that can show the network data collected by the dashboard component 114 from the network elements 104-112 in the network 102.

In an embodiment, the dashboard can include charts 402 and other data showing current and past network activity. The dashboard component 114 can generate the chart 402 based on data received from network elements in a network (e.g., network elements 104-112 in network 102). In an embodiment, dashboard component 114 can use flow metrics protocols to sample and analyze data and traffic to and from the network elements 104-112. The flow metrics can include NetFlow and sFlow and other protocols to determine the source and destination of traffic received at the network elements, class of service, and causes of congestion. In an embodiment, the dashboard component 114 can aggregate packets into flows and exports flow records towards one or more flow collectors and use the flow collectors to receive, store, and pre-process the flow data received from the flow exporter. The sampled and analyzed data can then be presented in charts such as chart 402.

The dashboard component 114 can also show a map 404 of the network 102. The map 404 can provide a visualization of how different network elements are connected to each other and their relationship and context in the network as a whole. In an embodiment, the network elements can be color coded to indicate volume of traffic, network attacks, or other information according to a predetermined scheme. Different colors can also represent different risk levels, or percentages of available bandwidth utilized. The dashboard component 114 can also put other indicators, such as flags, or notes next to the network elements in the map 404 to indicate information that can be useful to the network operator to mitigate potential and/or current network attacks.

The dashboard component 114 can also generate a list 406 of tools and services that are available to manage and counteract any network attacks. Dashboard component 114 can also identify the tools and services that are available to the network operators to mitigate the network attacks and manage the network. Firewalls and intrusion detection systems can be part of the solution, but other tools and services possibly available to the network operators include router filtering, overprovisioning, access control lists, and other techniques to mitigate the harm caused by network attacks. In an embodiment, dashboard component 114 can consult a predetermined playbook to determine what types of tools and services are best to respond to the current or potential network attacks. The dashboard component 114 can model different solutions and recommend one or more of the services to the network operator based on the type of attack. The dashboard component 114 can also use information from the third parties to respond to the network attack. For instance, if a similar attack has been experienced by another network, and a mitigation solution has proved effective or ineffective in mitigating the attack, dashboard component 114 can use that information when recommending tools and services and generate the list 406 that is available to the network operator.

Figure 5:
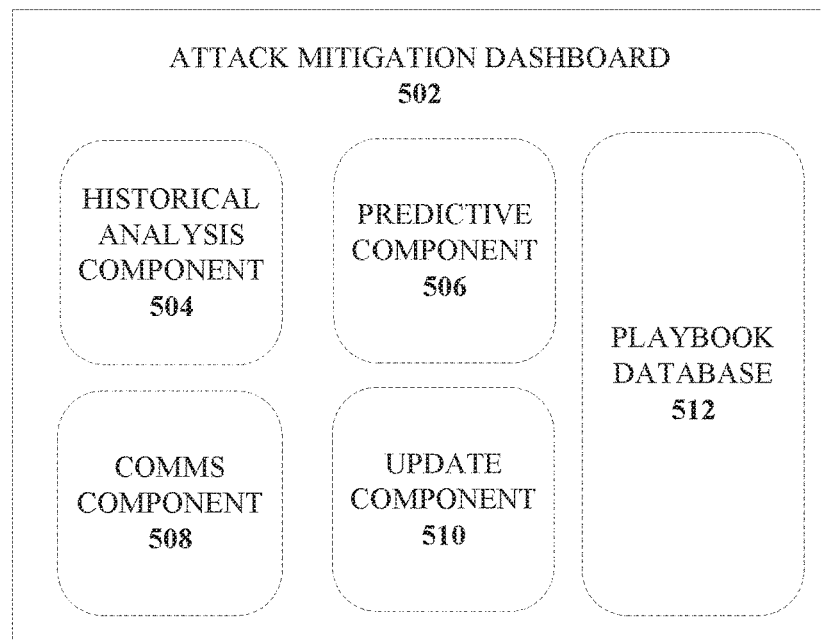
FIG. 5 is an illustration of an example attach mitigation dashboard in accordance with one or more aspects of the disclosure.

Turning now to FIG. 5, illustrated is an example attach mitigation dashboard system 500 in accordance with one or more aspects of the disclosure. Attach mitigation dashboard 502 can correspond to dashboard component 114 as shown in FIG. 1. The attack mitigation dashboard 502 can include a communications component 508 that receives network data from network elements in the network. The network data can come in the form of sampled data and network flows according to protocols such as sFlow, and NetFlow. The network data can include information relating to the volume of network traffic, the source and destination of the traffic, types of traffic, and etc.

In an embodiment, the communications component 508 can also receive intelligence feeds and data feeds from other networks, or other institutions. Other financial institutions or industry associations, or security organizations, or law enforcement sources can track what is happening on networks other than network, and provide realtime or close to realtime data feeds to communications component 508.

In an embodiment, the communications component 508 can also receive network data from an interactive voice response server that receives input from customers and other users of the network. If people call to indicate that they are experiencing slowness of one or more websites or tools or services hosted by the network, then the interactive voice response server can send the network data to communications component 508 to indicate that there is network slowness somewhere on the network, or can indicate that a particular network element or server is experiencing slowness. Thus, attack mitigation dashboard 502 can get user feedback of slowness from people calling a helpdesk number or other customer support number.

A historical analysis component 504 can track the data over time and analyze the data to determine patterns. The historical analysis component 504 can track the network traffic and operations over time to try to identify patterns and other cues that may indicate when an attack is going to happen. For instance, the historical analysis component 504 can look at network operations before previous attacks, and look at a predetermined amount of time, e.g., an hour, a day, a week, etc., of network data before the attack to determine if any patterns can be recognized to allow the network operator to begin mitigating the attack before it occurs. The historical analysis component 504 can also try to determine patterns based on the network data received from other networks.

In an embodiment, the predictive component 506 can predict, based on the analysis performed by the historical analysis component 504 when and where attacks may occur as well as predict the intensity and/or types of attacks. A playbook database 512 can store predetermined responses and protocols for a variety of different attacks, and the update component 510 can output to a dashboard the tools and services based on the playbook database 512 and the predicted attacks.

Figure 6:
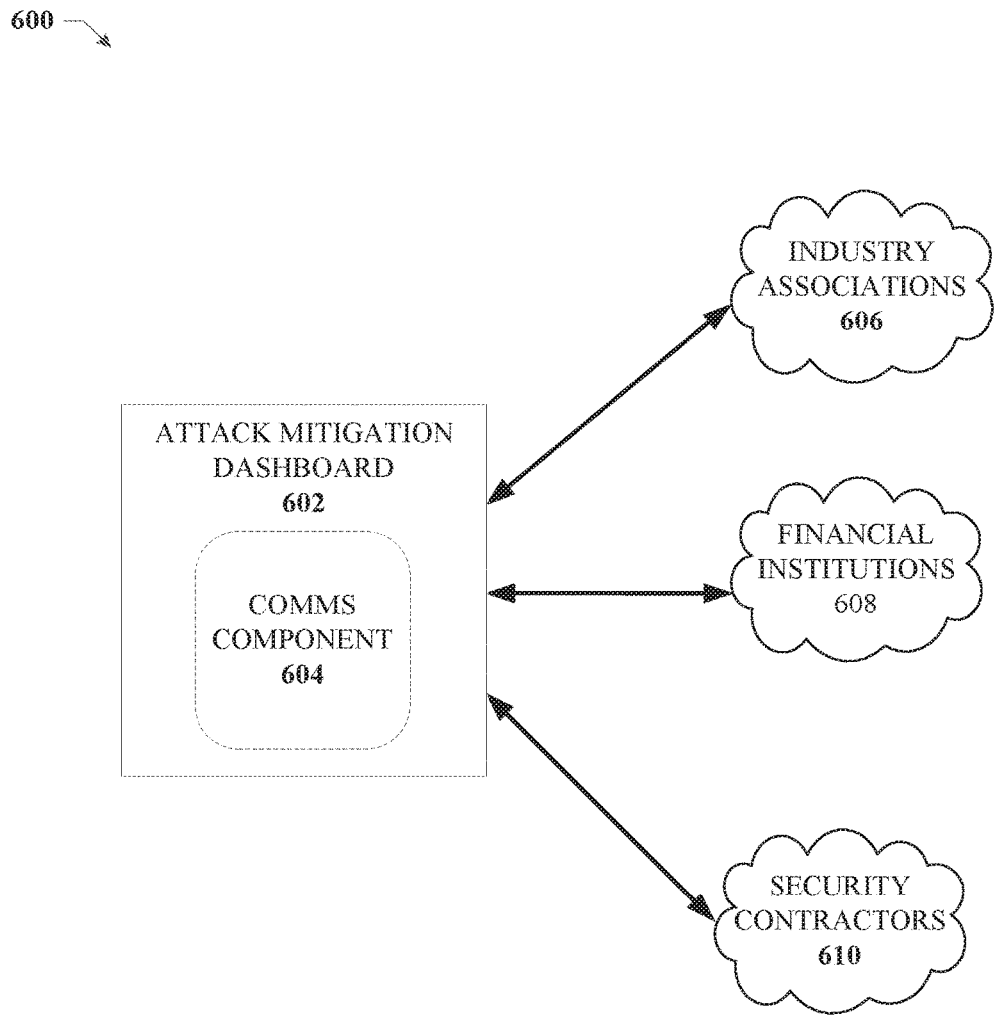
FIG. 6 is an illustration of an example attach mitigation dashboard in accordance with one or more aspects of the disclosure.

Turning now to FIG. 6 illustrated is an example attack mitigation dashboard system 600 in accordance with one or more aspects of the disclosure. In an embodiment, communications component 604 can receive intelligence feeds and data feeds from other networks and other institutions. Other financial institutions 608 or industry associations 606, or security organizations 610, or even law enforcement sources can track what is happening on networks other than network, and provide realtime or close to realtime data feeds to communications component 604. In another embodiment, the communications component 604 can also send network data and analysis information to these networks about network attacks and traffic at the network associated with the attack mitigation dashboard.

Figure 7:
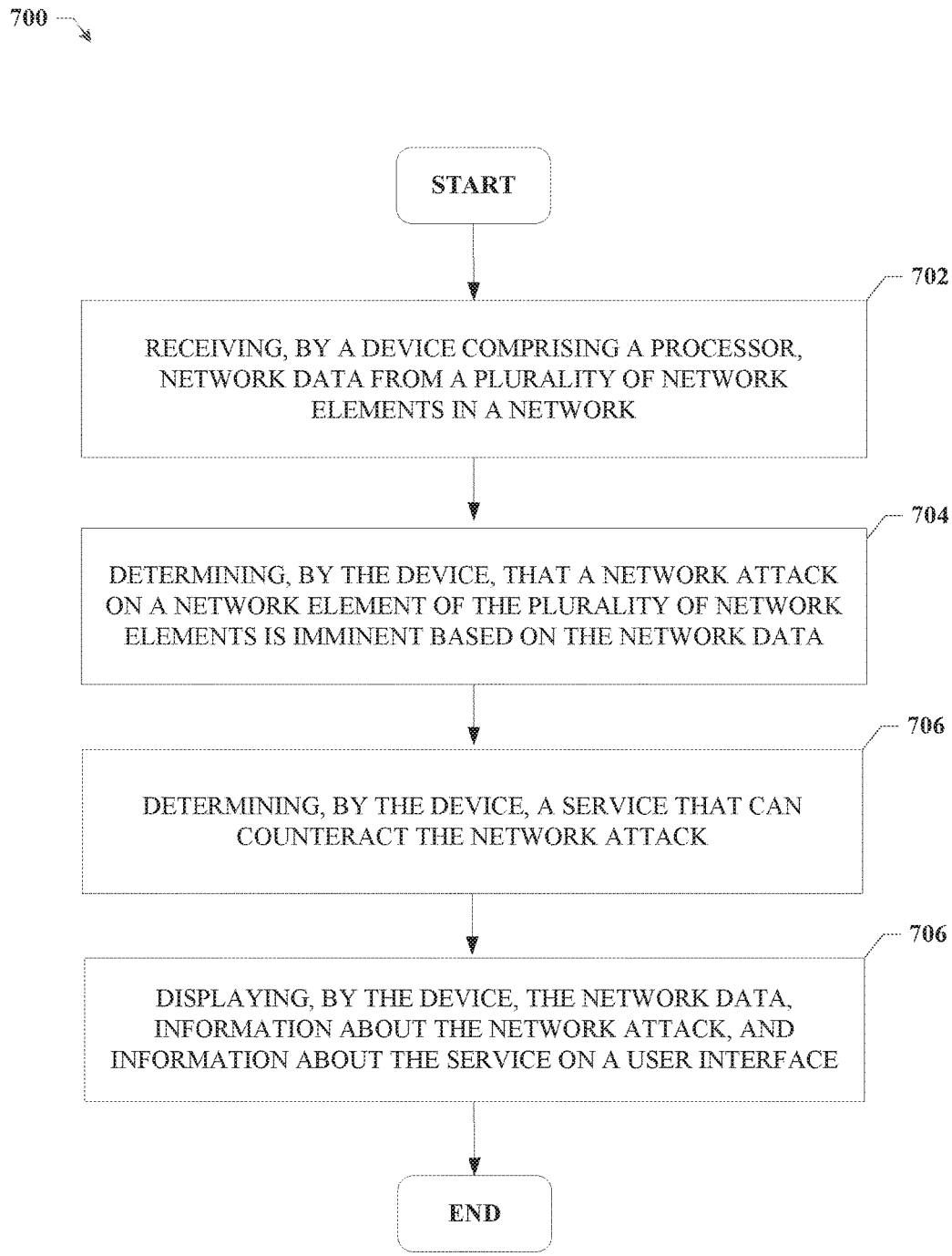
FIG. 7 is an illustration of an example flow chart of a method for attack mitigation according to one or more embodiments.
Figure 8:
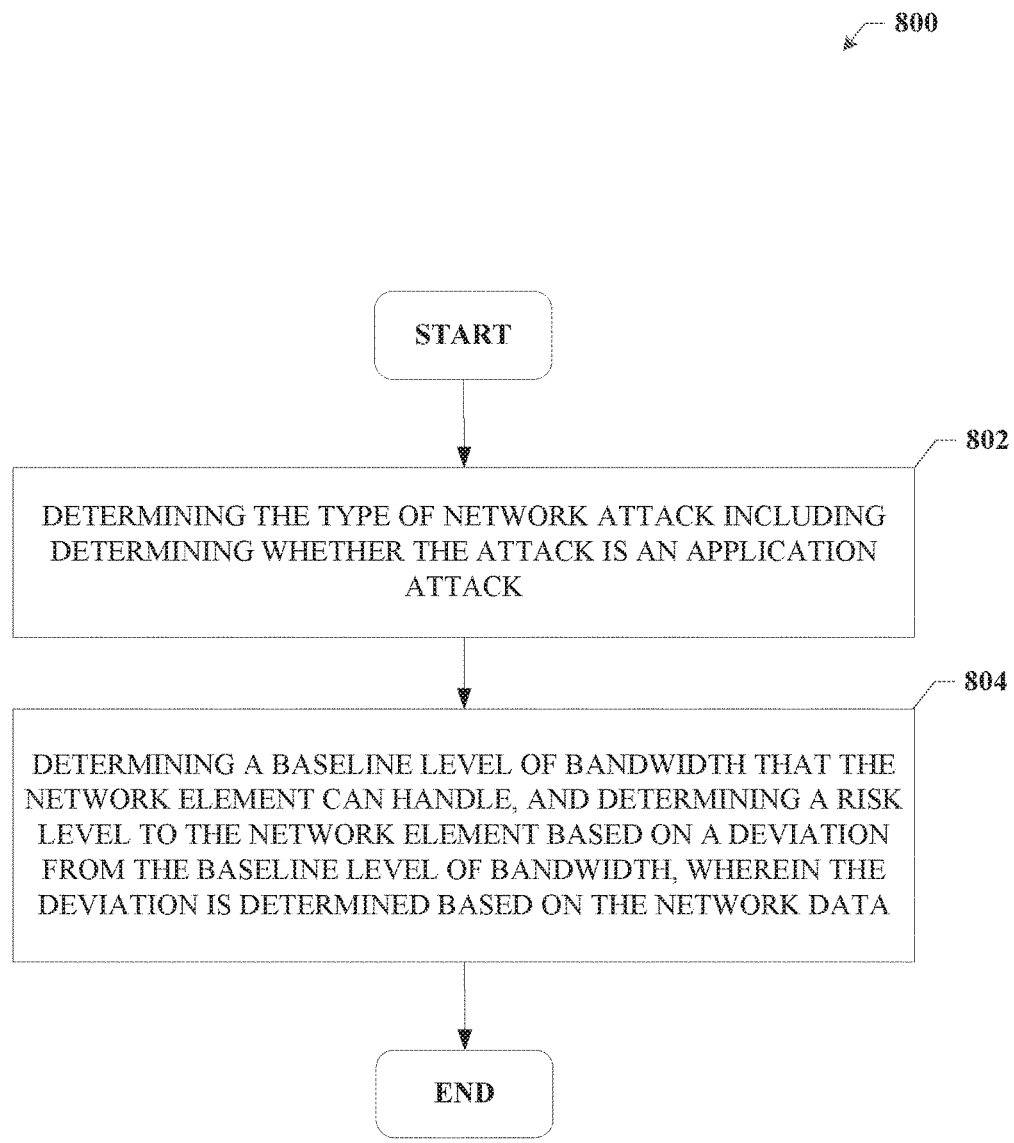
FIG. 8 is an illustration of an example flow chart of a method for attack mitigation according to one or more embodiments.

FIGS. 7-8 illustrates processes in connection with the aforementioned systems. The process in FIGS. 7-8 can be implemented for example by systems 100, 200, 210, 300, 400, 500, and 600 illustrated in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 7, illustrated is an example flow chart 700 of a method for attack mitigation according to one or more embodiments.

The method can start at 702, where the method includes receiving, by a device comprising a processor, network data from a plurality of network elements in a network. In an embodiment, the device can analyze traffic and network data at a list of predefined network elements, a subset of network elements in a network, or all network elements in a network. It is to be appreciated that network is not limited to being a logical or physical local network. In some embodiments, the network can refer to a variety a networks that are under control and management by an network operator associated with the device. For instance, the various network elements can be disparate servers, and other physical devices that are on a local network or externally facing, or on different networks completely The method can continue at 704, where the method includes determining, by the device, that a network attack on a network element of the plurality of network elements is imminent based on the network data. The device can track the network traffic and operations over time to try to identify patterns and other cues that may indicate when an attack is going to happen. For instance, the device can look at network operations before previous attacks, and look at a predetermined amount of time, e.g., an hour, a day, a week, etc., of network data before the attack to determine if any patterns can be recognized to allow the network operator to begin mitigating the attack before it occurs.

The method can continue at 706 where the method includes determining, by the device, a service that can counteract the network attack. The device can also identify the tools and services that are available to the network operators to mitigate the network attacks and manage the network. Firewalls and intrusion detection systems can be part of the solution, but other tools and services possibly available to the network operators include router filtering, overprovisioning, access control lists, and other techniques to mitigate the harm caused by network attacks. In an embodiment, the device can consult a predetermined playbook to determine what types of tools and services are best to respond to the current or potential network attacks. The device can model different solutions and recommend one or more of the services to the network operator based on the type of attack. The device can also use information from the third parties to respond to the network attack. For instance, if a similar attack has been experienced by another network, and a mitigation solution has proved effective or ineffective in mitigating the attack, device can use that information when recommending tools and services.

The method can continue at 708 where the method includes displaying, by the device, the network data, information about the network attack, and information about the service on a user interface. The device can generate an interactive dashboard that can show the network data collected by the device from the network elements in the network 102.

In an embodiment, the dashboard can include charts and other data showing current and past network activity. The device can generate the chart based on data received from network elements in a network. The device can also show a map of the network. The map can provide a visualization of how different network elements are connected to each other and their relationship and context in the network as a whole. In an embodiment, the network elements can be color coded to indicate volume of traffic, network attacks, or other information according to a predetermined scheme. Different colors can also represent different risk levels, or percentages of available bandwidth utilized. The device can also generate a list of tools and services that are available to manage and counteract any network attacks.

Turning now to FIG. 8, illustrated is an example flow chart 800 of a method for attack mitigation according to one or more embodiments.

Method 800 can start at 802 where the method includes determining the type of network attack including determining whether the attack is an application attack. The dashboard system can determine that the network=is experiencing a volumetric attack. A volumetric attack is the simplest of the DDoS attack types. Its goal is to flood a target with as much traffic as possible to prevent it from operating normally. To be successful, the volumetric DDoS attack only needs to take up enough of the target's Internet connection capacity to affect legitimate operations; a really successful attack will be able to affect most or all of the target's clients. Some common examples of a volumetric attack are Internet Control Message Protocol (ICMP)/User Datagram Protocol (UDP) packet floods, Spoofed packet floods and malformed packet floods.

A protocol attack is a little different and is focused on exhausting the protocol resources of a target. Some common protocol DDoS attack examples include TCP SYN/ACK/RST/Connection floods, TCP state exhaustion and TCP windowing attacks. This type of attack does not require that the attacker consume most or all of the target's available bandwidth, only that it consumes the target's specific resource. An application attack is focused further up the chain with a specific application resource. The application DDoS attack is focused more on specific vulnerabilities while the others are targeted at more general resources that exist on many devices. What this means is that this style of attack does not need to be as coordinated as the other two. Some common examples include HTTP GET/POST Floods, DNS amplification, and SSL exhaustion attacks.

The method can continue at 804 where the method includes determining a baseline level of bandwidth that the network element can handle, and determining a risk level to the network element based on a deviation from the baseline level of bandwidth, wherein the deviation is determined based on the network data.

Figure 9:
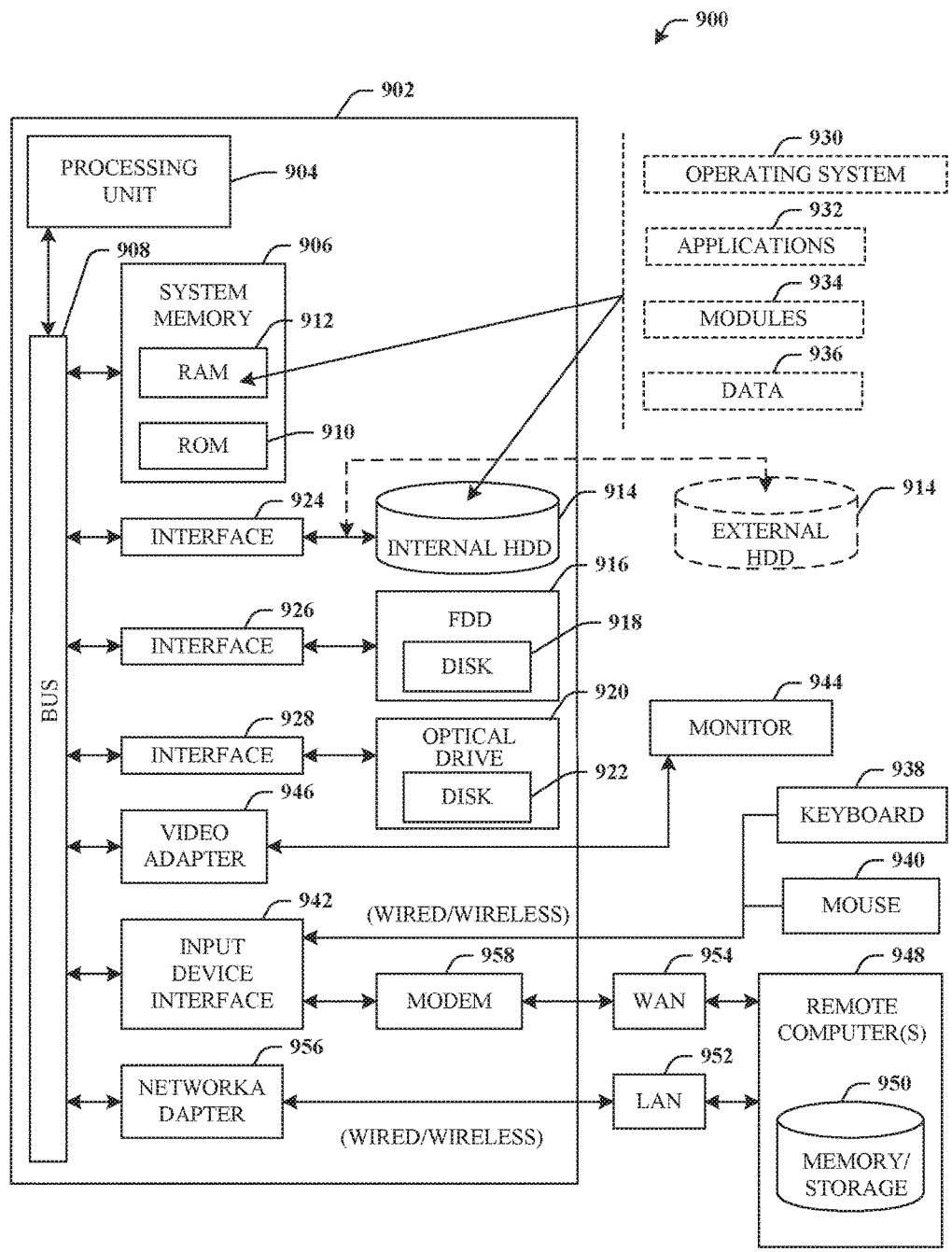
FIG. 9 is an illustration of an example computing environment where one or more of the provisions set forth herein are implemented, according to one or more embodiments.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. The innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules or components depicted relative to the computer 902, or portions thereof, can be stored in the remote memory/storage device 950. The network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 10:
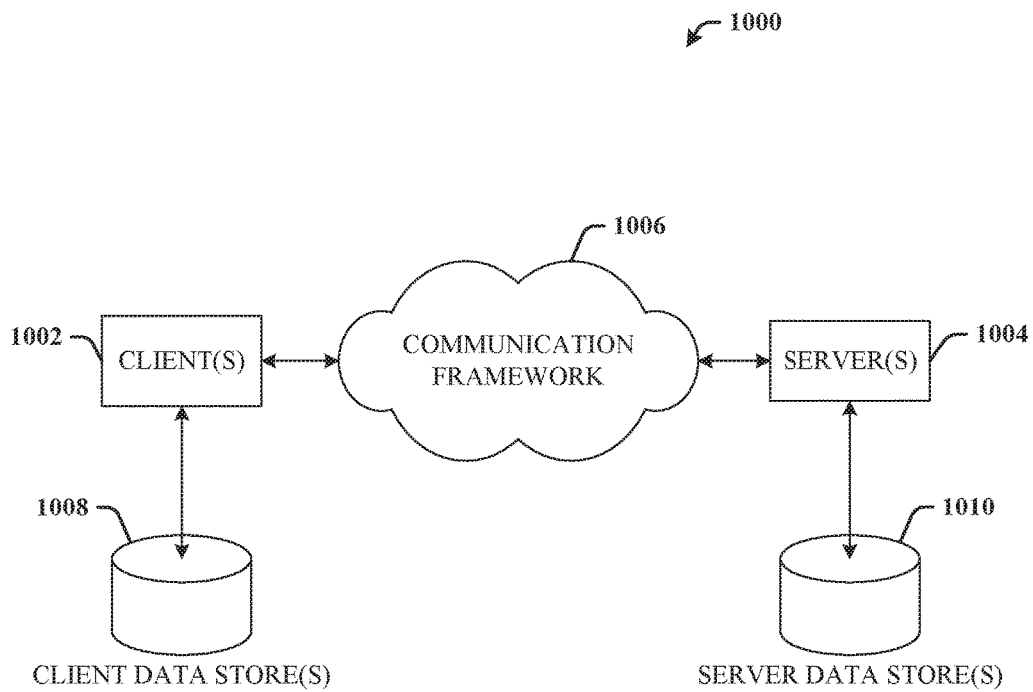
FIG. 10 is an illustration of an example computing environment where one or more of the provisions set forth herein are implemented, according to one or more embodiments.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
a memory configured to store computer-executable instructions; and
a processor, communicatively coupled to the memory, configured to execute the computer-executable instructions to perform operations, the operations comprising:
receiving network data from a plurality of network elements in a network, wherein the network data comprises a sample of packet flow comprising data relating to protocol types, interface information, metrics, and speed of packets arriving at the network element;
determining a baseline level of bandwidth that a network element of the plurality of network elements can handle, and determining a risk level to the network element based on a deviation from the baseline level of bandwidth, wherein the deviation is determined based on the network data;
predicting an occurrence and intensity of a network attack on the network element based on the network data;
determining a service that can counteract the network attack before the occurrence; and
displaying the network data, the risk level to the network element, information about the network attack, and information about the service on a user interface.

2. The system of claim 1, wherein the network attack comprises at least one of a denial of service attack or a distributed denial of service attack.

3. The system of claim 1, wherein the operations further comprise:
determining that the network attack is imminent.

4. The system of claim 1, wherein the operations further comprise:
receiving a second set of network data from a second network different than the network.

5. The system of claim 1, wherein the sample of packet flow comprises at least one of sflow or netflow data.

6. The system of claim 1, wherein the predicting that the network attack is will occur further comprises predicting a type of network attack including predicting whether the network attack is an application attack.

7. The system of claim 1, wherein the operations further comprise:
determining the service based on deviation of network data from a baseline level of bandwidth and a type of network attack.

8. The system of claim 1, wherein the operations further comprise:
receiving network performance data from consumer feedback received via an interactive voice response service.

9. The system of claim 1, wherein the operations further comprise:
transmitting the network data and the information about the network attack to a third party server.

10. A method for providing a dashboard for network attack mitigation, comprising:
receiving, by a device comprising a processor, network data from a plurality of network elements in a network, wherein the network data comprises a sample of packet flow comprising data relating to protocol types, interface information, metrics, and speed of packets arriving at the network element;
determining a baseline level of bandwidth that a network element of the plurality of network elements can handle, and determining a risk level to the network element based on a deviation from the baseline level of bandwidth, wherein the deviation is determined based on the network data;
predicting, by the device, an occurrence and intensity of a network attack on the network element based on the network data;
determining, by the device, a service that can counteract the network attack before the occurrence; and
displaying, by the device, the network data, the risk level to the network element, information about the network attack, and information about the service on a user interface.

11. The method of claim 10, further comprising:
determining, by the device, that the network attack is imminent based on historical attacks and current network data.

12. The method of claim 10, further comprising:
determining, by the device, that the network attack is currently underway.

13. The method of claim 10, further comprising:
receiving, by the device, a second set of network data from a second network different than the network.

14. The method of claim 10, further comprising:
transmitting, by the device, the network data and the information about the network attack to a third party server.

15. A non-transitory computer-readable medium, comprising instructions, that when executed by a computer processor, perform operations, comprising:
receiving network data from a plurality of network elements in a network wherein the network data comprises a sample of packet flow comprising data relating to protocol types, interface information, metrics, and speed of packets arriving at the network element;
determining a baseline level of bandwidth that a network element of the plurality of network elements can handle, and determining a risk level to the network element based on a deviation from the baseline level of bandwidth, wherein the deviation is determined based on the network data;
predicting an occurrence and intensity of a network attack on the network element based on the network data;
determining a service that can counteract the network attack before the occurrence; and
displaying the network data, the risk level to the network element, information about the network attack, and information about the service on a user interface.

16. The non-transitory computer-readable medium of claim 15, the operations further comprising predicting a type of network attack and identifying one or more services associated with the type of network attack that mitigate the network attack before the network attack occurs.

* * * * *